United States Patent [19]

Thomann

[11] Patent Number: 4,766,717
[45] Date of Patent: Aug. 30, 1988

[54] AGRICULTURAL APPARATUS FOR MAKING ROUND BALES

[75] Inventor: Hans Thomann, Wachenroth, Fed. Rep. of Germany

[73] Assignee: Klockner-Humboldt-Deutz AG, Cologne, Fed. Rep. of Germany

[21] Appl. No.: 88,920

[22] Filed: Aug. 24, 1987

[30] Foreign Application Priority Data

Aug. 22, 1986 [DE] Fed. Rep. of Germany ....... 3628633

[51] Int. Cl.$^4$ ...................... A01D 89/00; A01D 90/04
[52] U.S. Cl. ........................................ 56/341; 56/14.6;
56/364; 130/27 R; 130/27 T
[58] Field of Search ........................ 56/14.6, 364, 341;
130/27 R, 27 T, 304.1 T

[56] References Cited

U.S. PATENT DOCUMENTS 4,619,106 10/1986 van der Lely .......................... 56/341

FOREIGN PATENT DOCUMENTS 3302706 8/1983 Fed. Rep. of Germany ........ 56/341
3428904 2/1986 Fed. Rep. of Germany ........ 100/88

Primary Examiner—Douglas Hart
Attorney, Agent, or Firm—Herbert Dubno

[57] ABSTRACT

A baler has a housing normally displaceable in a travel direction along the ground and forming a rotary baling chamber, guides forming relative to the direction a passage having a forwardly opening front end and a rear end opening rearward into the chamber, a pickup device forward of the passage for picking a strand of crop up off the ground and feeding it up and back to the front end of the passage, and a conveyor having relative to a conveyor axis at least two angularly spaced sets of radially projecting and axially spaced arms engageable radially downward into the passage and movable backward in the passage to advance the strand of crop backward in the passage and into the baling chamber where it is wound up into a large cylindrical bale. The arms of each set are axially aligned with one another and angularly offset from the arms of the other set. A rotatable cutter below the passage has a shaft carrying two sets of generally identical and generally semicircular blades engageable up into the passage at the conveyor with the blades of one of the sets being axially interleaved with but offset by about 180° to those of the other set. The cutter and conveyor are synchronously rotated about the respective axes to introduce a blade upward into the strand between two respective axially adjacent conveyor arms of the same set and angularly in line with two angularly succeeding arms of the preceding and following sets.

3 Claims, 2 Drawing Sheets

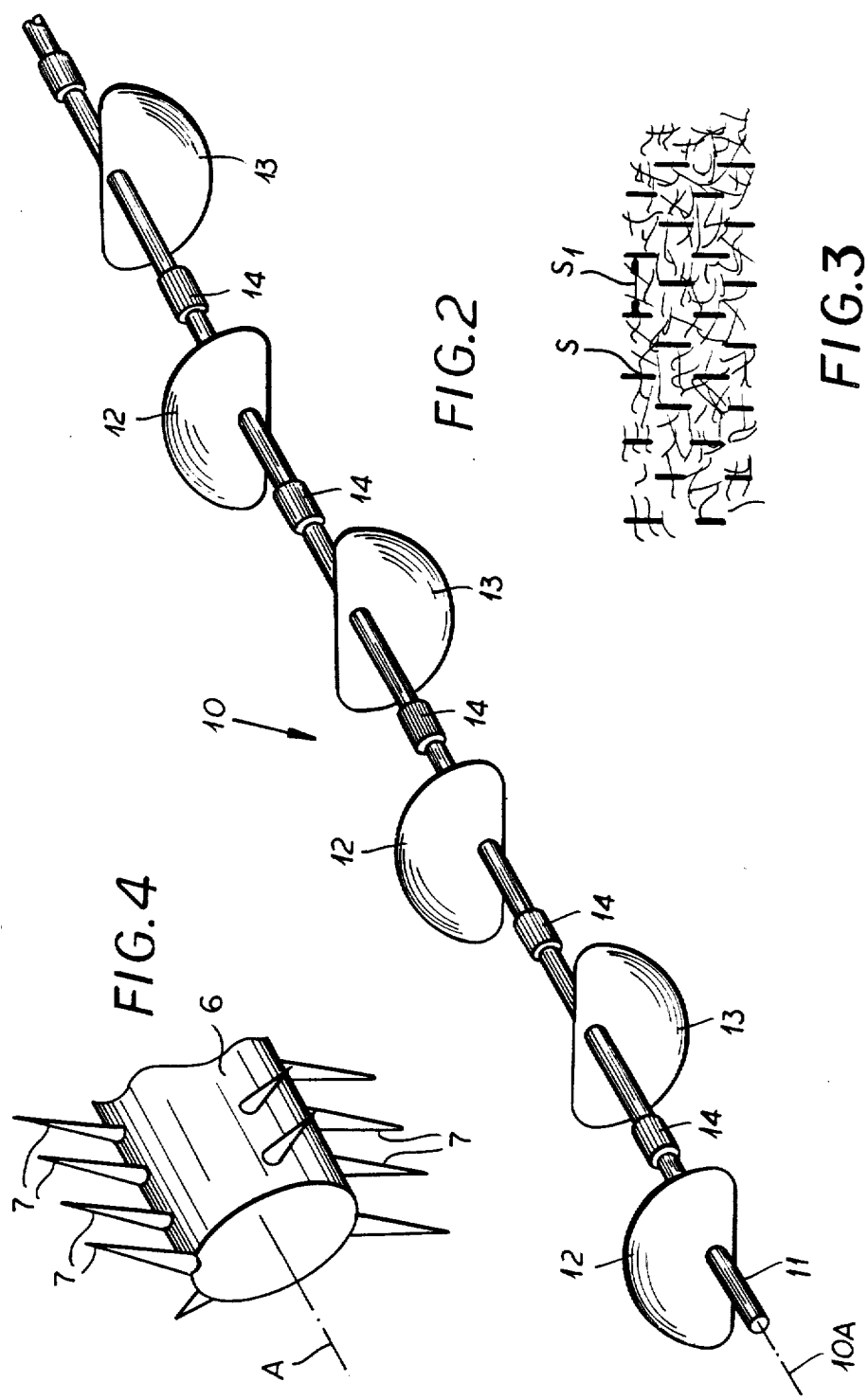

AGRICULTURAL APPARATUS FOR MAKING ROUND BALES

FIELD OF THE INVENTION

The present invention relates to a baler. More particularly this invention concerns such a baler which picks cut crop up off the ground and produces large-format cylindrical bales from it.

BACKGROUND OF THE INVENTION

A standard baler such as described in German Patent document No. 3,445,050 makes large bales of cylindrical shape, so-called "round" bales, as opposed to smaller bales of parallepipedal shape, so called "square bales". Such a round baler comprises a housing normally displaceable in a travel direction along the ground and forming a rotary baling chamber, guides forming relative to the direction a passage having a forwardly opening front end and a rear end opening rearward into the chamber, and a pickup device forward of the passage for picking a strand of crop up off the ground and feeding it up and back to the front end of the passage. A conveyor has arms engageable downward into the passage between its ends and movable backward in the passage to advance the strand of crop backward in the passage to the baling chamber where rollers or the like wind up the strand into a cylindrical bale. To tenderize the strand and make it easier to roll up a cutter has a plurality of blades engageable upward into the passage generally at the conveyor for forming a generally random array of longitudinal slits in the strand in the passage. Unfortunately in some locations these slits are so dense that they excessively weaken the bale and that in other locations are so sparse that it is very difficult to get the crop off the bale, necessitating the use of a machine of the type described in German utility model No. 7,812,292.

OBJECTS OF THE INVENTION

It is therefore an object of the present invention to provide an improved round baler.

Another object is the provision of a round baler which produces a coherent bale that is nonetheless readily unwound.

A further object of this invention is to provide a round baler which uses a minimum amount of blades that can be relatively easily changed.

Yet another object is to provide an improved cutter for such a round baler which forms a very regular array of longitudinal slits in the strand being baled.

SUMMARY OF THE INVENTION

A baler according to the invention has a housing normally displaceable in a travel direction along the ground and forming a rotary baling chamber, guides forming relative to the direction a passage having a forwardly opening front end and a rear end opening rearward into the chamber, a pickup device forward of the passage for picking a strand of crop up off the ground and feeding it up and back to the front end of the passage, and a conveyor having relative to a conveyor axis at least two angularly spaced sets of radially projecting and axially spaced arms engageable radially downward into the passage and movable backward in the passage to advance the strand of crop backward in the passage and into the baling chamber. The arms of each set are axially aligned with one another and angularly offset from the arms of the other set and the sets of arms define an orbit chordally traversed below the conveyor axis by the passage. The strand is wound up in the passage by baling rollers or the like into a cylindrical bale. A cutter rotatable about a cutter axis below the passage has a shaft carrying two sets of generally identical and generally semicircular blades all having generally part-circular outer edges defining a cylinder centered on the cutter axis, overlapping the conveyor orbit, and chordally traversed above the cutter axis by the passage. The blades are engageable up into the passage at the conveyor with the blades of one of the sets being axially interleaved with but offset by about 180° to those of the other set. The cutter and conveyor are synchronously rotated about the respective axes to introduce a blade upward into the strand between two respective axially adjacent conveyor arms of the same set and angularly in line with two angularly succeeding arms of the preceding and following sets. The arms of succeeding sets of conveyor arms are staggered and spaced like the blades of the cutter.

The use of semicircular blades produces slits that are sufficiently long and that are spread out over a very uniform array, with the same longitudinal and transverse spacing. Thus even though a relatively small number of blades are used the crop is treated such that the fully wound or packed bale can be relatively easily unwound in one direction. On the other hand it can be rolled or handled without unwinding provided some care is taken as to which direction it is rolled in relative to the windup direction.

According to this invention each set of blades moves once during each revolution of the cutter shaft through a position substantially wholly out of the passage. While this one set is out of the passage the other set of blades is in the passage and vice versa. This produces very even loading on the cutter and allows it to work off a relatively weak motor.

In accordance with a further feture of the invention the shaft is formed of an axially aligned set of shaft sections each carrying a respective one of the blades and couplings axially interconnecting and spacing the shaft sections. This makes it easy to manufacture and service the cutter, holding down its production costs and making it possible, if necessary, to replace a broken blade even in the field.

DESCRIPTION OF THE DRAWING

The above and other objects, features, and advantages will become more apparent from the following, reference being made to the accompanying drawing in which:

FIG. 2 is a large-scale perspective view of the cutter assembly of this invention;

FIG. 3 is a mainly diagrammatic view illustrating the pattern of cuts produced by the system of the present invention; and FIG. 4 is a small-scale perspective view of a detail of the instant invention.

SPECIFIC DESCRIPTION

Figure 1:
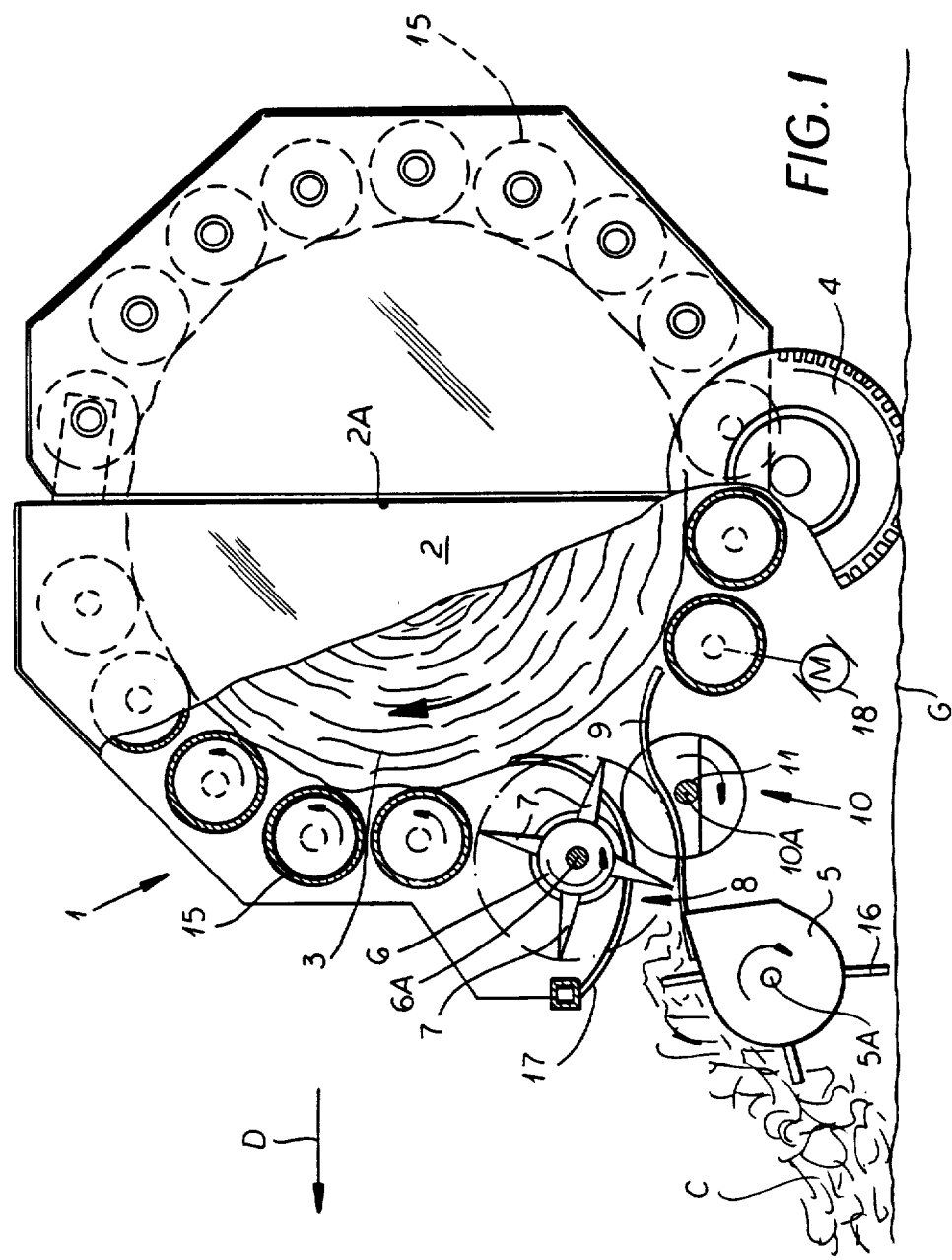
FIG. 1 is a partly sectional and partly diagrammatic side view of the baler according to this invention.

As seen in FIG. 1 the baler 1 according to this invention is supported on wheels 4 and is normally pulled by a tractor in a in a direction D. The baler 1 forms a large cylindrical baling chamber 2 that is centered on a horizontal axis 2A perpendicular to the travel direction D of the baler 1. As will be described below a semicoherent strand of crop C is picked up off the ground and fed tangentially into this chamber 2 where it is wound up by baling rollers 15 into a large cylindrical bale 3 which, when big enough, is expelled from the chamber 2 by opening it up and dropping out the bale 3.

As is standard the crop C is picked up off the ground by a pickup device 5 having four sets of tines 16 angularly equispaced about an axis 5A parallel to that of the chamber 2. The pickup device 5 is rotated about its axis 5A clockwise as seen in FIG. 1 by a motor illustrated diagrammatically at 18 so that its tines 16 sweep forward in the direction D on the ground G, pick up the windrow of crop C, and feed it back (opposite to the direction D) toward the chamber 2.

Immediately behind and above the pickup device 5 are downwardly and upwardly curved guides 9 and 17 defining a passage 9 that opens forward just above the device 5 to receive the picked-up strand of crop C therefrom and that opens rearward generally radially into the baling chamber 2. This passage 8 is closed laterally, that is has unillustrated sides extending vertically perpendicular to the axes 2A and 5A to laterally confine the rearwardly moving crop strand.

A conveyor drum 6 centered on an axis 6A parallel to the axis 5A and lying just outside the passage 8 above the upper guide 17 carries four sets of entrainment arms 7 that can, when extending downward from the axis 6A, project through the upper guide 17 into the passage 8 and virtually to the lower guide. The arms 7 are here arranged in four sets with the arms 7 of diametrally opposite sets being angularly in line with each other but staggered relative to the arms 7 of the intervening sets as shown in FIG. 4. Thus the arms 7 will engage at a succession of transversely spaced points in the crop strand and then upstream thereof at another succession of axially offset points and so on.

The motor 18 rotates the conveyor 6, 7 counterclockwise as seen in FIG. 1 to sweep the arms 7 down and back in the passage 8, thereby engaging in the crop strand delivered to the passage 8 by the device 5 and moving it backward, toward the chamber 2.

According to the invention a cutter 10 is provided powered by the motor 18 for rotation about an axis 10A slightly underneath the lower guide 9, parallel to the axes 2A, 5A, and 6A, and somewhat back from the axis 6A. As better shown in FIG. 2 this cutter basically comprises a shaft 11 carrying a plurality of identical semicircular blades 12 and 13. In fact the shaft 11 is formed of a succession of short sections fixed together by spacer couplings 14 to allow easy removal, repair, and replacement of any one cutter blade 12 or 13.

The semicircular blades 12 are all in axial alignment, that is their straight diameter edges are all generally coplanar on a plane parallel to but slightly offset from the axis and these blades 12 all lie to the same side of this imaginary plane. The other blades 13 which are regularly interleaved and alternate with the blades 12 are similarly in axial alignment but offset by 180° from the blades 12. Thus the imaginary plane formed by the straight diametral edges of the blades 13 would be parallel to that of the blades 12 but oppositely offset from the axis 11A. The round outer edges of the blades 12 and 13, which are, in fact, each slightly more than semicircles so that the straight edges are actually chords all lie on the same imaginary cylinder centered on the axis 11A.

The drive motor 18 drives the pickup device 5, conveyor 6, and cutter 10 synchronously. The tines 16 and arms 7 are moved at the same peripheral speed unless the incoming strand of crop is to be longitudinally compacted or drawn out. The cutter 10 is rotated at twice the angular speed as the conveyor 6 and these two are positively connected together so that the blades 12 and 13 engage between succeeding sets of arms 7. The result is as shown in FIG. 3 the formation of a regular array of rows of slits S in the crop strand, with the slits S of each row being staggered relative to those of the adjacent rows. A standard lateral spacing $S^1$ of slots S in the crop would be 16 cm, indicating the blades 12 and 13 are spaced axially at 8 cm on center.

The axial spacing of axially adjacent arms 7 in the same row is the same, here 16 cm, as that of axially adjacent blades 12 or 13 of the same set. The synchronism of the conveyor 6 and cutter 10 is such that the blades 12 and 13 enter the crop strand always angularly directly behind an arm 7 of one set of arms 7, between two arms 7 of the succeeding set, and angularly directly in front of an arm 7 of the yet succeeding set. In other words each blade will enter the strand between four conveyor arms 7 so that there will be on interference between these elements and so that the crop is sliced with minimum effort.

Thus slicing or tenderizing the crop strand before winding it up into a bale 3 ensures that the strand will retain good longitudinal coherence, but will lose much of its trasverse coherence. This makes it wind up well, hold well enough in the bale for some handling, and still unwind easily for efficient use of the crop.

I claim:

1. A baler comprising:
    a housing normally displaceable in a travel direction along the ground and forming a rotary baling chamber;
    guides forming relative to the direction a passage having a forwardly opening front end and a rear end opening rearward into the chamber;
    means including a pickup device forward of the passage for picking a strand of crop up off the ground and feeding it up and back to the front end of the passage;
    means including a conveyor having relative to a conveyor axis at least two sets of radially projecting and axially spaced arms engageable radially downward into the passage and movable backward in the passage to advance the strand of crop backward in the passage and into the baling chamber, the arms of each set being axially aligned with one another and angularly offset from the arms of the other set, the sets of arms defining an orbit chordally traversed below the conveyor axis by the passage;
    means in the chamber for winding up the strand issuing from the rear end of the passage into a cylindrical bale;
    a cutter rotatable about a cutter axis below the passage and having a shaft carrying two sets of generally identical and generally semicircular blades all having generally part-circular outer edges defining a cylinder centered on the cutter axis, overlapping the conveyor orbit, and chordally traversed above the cutter axis by the passage, the blades being engageable up into the passage at the conveyor, the blades of one of the sets being axially interleaved with but offset by about 180° to those of the other set; and means for synchronously rotating the cutter and conveyor to introduce a blade upward into the strand between two respective axially adjacent conveyor arms of the same set and angularly in line with two angularly succeeding arms of the preceding and following sets, the arms of succeeding sets of conveyor arms being staggered and spaced like the blades of the cutter.

2. The baler defined in claim 1 wherein each set of blades moves during each revolution of the cutter shaft into a position substantially wholly out of the passage, the other set of blades being in the passage at this time.

3. The baler defined in claim 1 wherein the shaft is formed of an axially aligned set of shaft sections each carrying a respective one of the blades and couplings axially interconnecting and spacing the shaft sections.

* * * * *